(12) United States Patent
Adachi

(10) Patent No.: US 10,396,607 B2
(45) Date of Patent: Aug. 27, 2019

(54) BUS RING UNIT

(71) Applicant: Suncall Corporation, Kyoto-shi, Kyoto-fu (JP)

(72) Inventor: Yuusuke Adachi, Kyoto (JP)

(73) Assignee: Suncall Corporation, Kyoto-shi, Kyoto (JP)

(*) Notice: Subject to any disclaimer, the term of this patent is extended or adjusted under 35 U.S.C. 154(b) by 261 days.

(21) Appl. No.: 15/121,729

(22) PCT Filed: Feb. 20, 2015

(86) PCT No.: PCT/JP2015/054715
§ 371 (c)(1),
(2) Date: Aug. 25, 2016

(87) PCT Pub. No.: WO2015/137082
PCT Pub. Date: Sep. 17, 2015

(65) Prior Publication Data
US 2016/0365761 A1    Dec. 15, 2016

(30) Foreign Application Priority Data

Mar. 14, 2014 (JP) .................... 2014-051708
Feb. 19, 2015 (JP) .................... 2015-030335

(51) Int. Cl.
*H02K 1/18*    (2006.01)
*H02K 3/52*    (2006.01)

(52) U.S. Cl.
CPC ............ *H02K 1/185* (2013.01); *H02K 3/522* (2013.01); *H02K 2203/09* (2013.01)

(58) Field of Classification Search
CPC .. H02K 3/18; H02K 3/46; H02K 3/50; H02K 3/52

(Continued)

(56) References Cited

U.S. PATENT DOCUMENTS 6,914,356 B2 * 7/2005 Yamamura ............... H02K 3/50
310/71
2015/0061431 A1 * 3/2015 Egami .................... H02K 3/522
310/71

FOREIGN PATENT DOCUMENTS

JP    2003-324887    11/2003
JP    2006-296104    10/2006
(Continued)

OTHER PUBLICATIONS

Machine translation of JP 2012135176 A.*
(Continued)

*Primary Examiner* — Quyen P Leung
*Assistant Examiner* — Minki Chang
(74) *Attorney, Agent, or Firm* — Sterne, Kessler, Goldstein & Fox, P.L.L.C.

(57) ABSTRACT

In the present invention, single-phase bus rings have single-phase-side rounded regions that are disposed at intervals on a circle smaller than a neutral-point bus ring and are positioned so that its circumferential edges are displaced in the circumferential direction relative to neutral-point-side connecting regions of the neutral-point bus ring and are positioned in a second axial position that is farther from a stator than a first axial position on which the neutral-point bus ring is partially positioned, and a pair of single-phase-side projections that extend radially outward from the circumferential edges of adjacent single-phase-side rounded regions beyond portions of the neutral-point-side rounded regions positioned in the first axial position, and are connected to each other at distal ends.

15 Claims, 12 Drawing Sheets

(58) Field of Classification Search
USPC .......................................................... 310/71
See application file for complete search history.

(56) References Cited

FOREIGN PATENT DOCUMENTS

JP    2012135176 A  *  7/2012
JP    2013-102596      5/2013

OTHER PUBLICATIONS

International Preliminary Report on Patentability issued in International Application No. PCT/JP2015/054715, dated Sep. 14, 2016, 5 pages.
International Search Report issued in International Application No. PCT/JP2015/054715, dated Sep. 17, 2015, 3 pages.

* cited by examiner

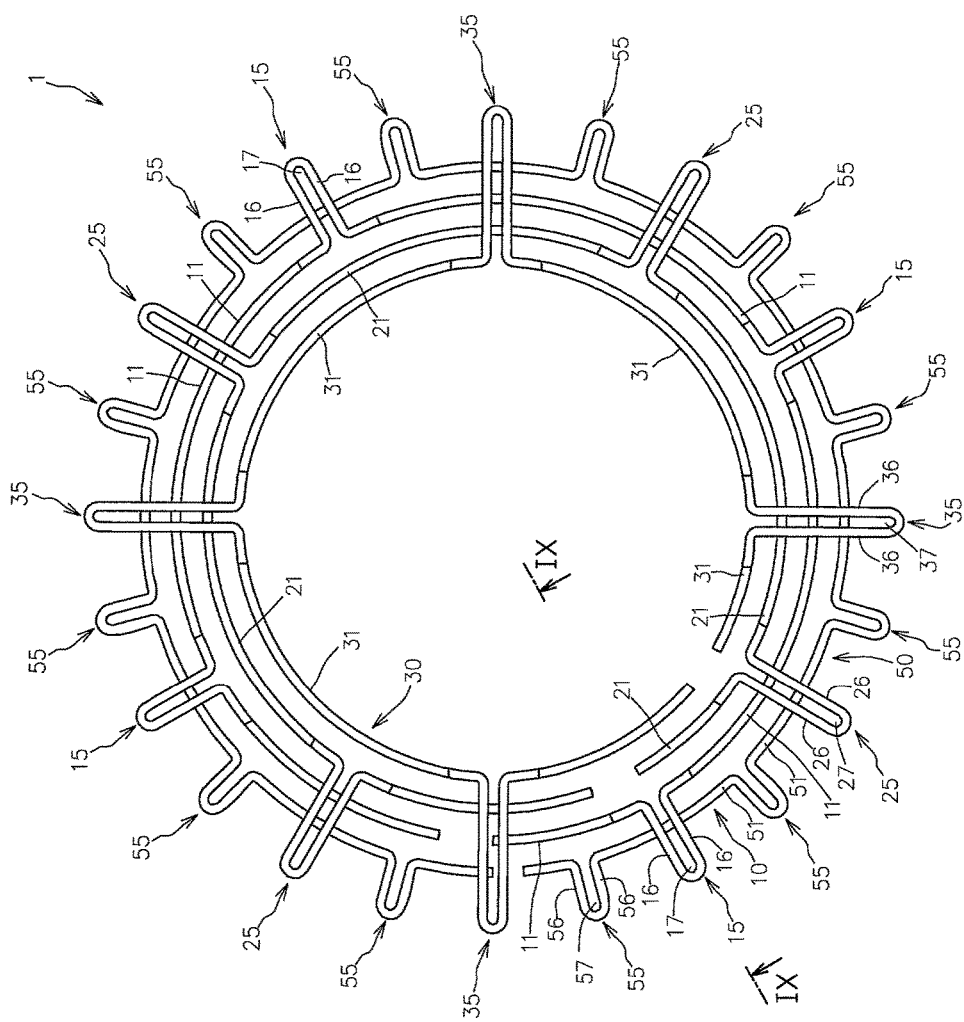

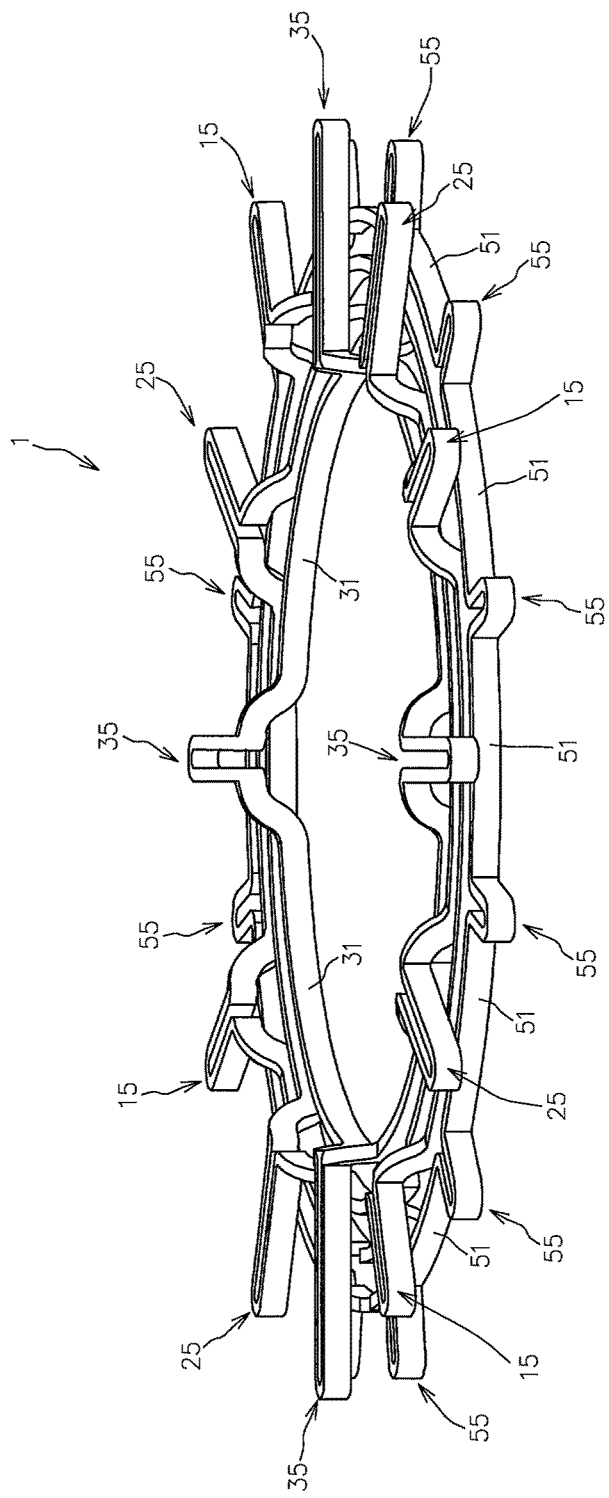

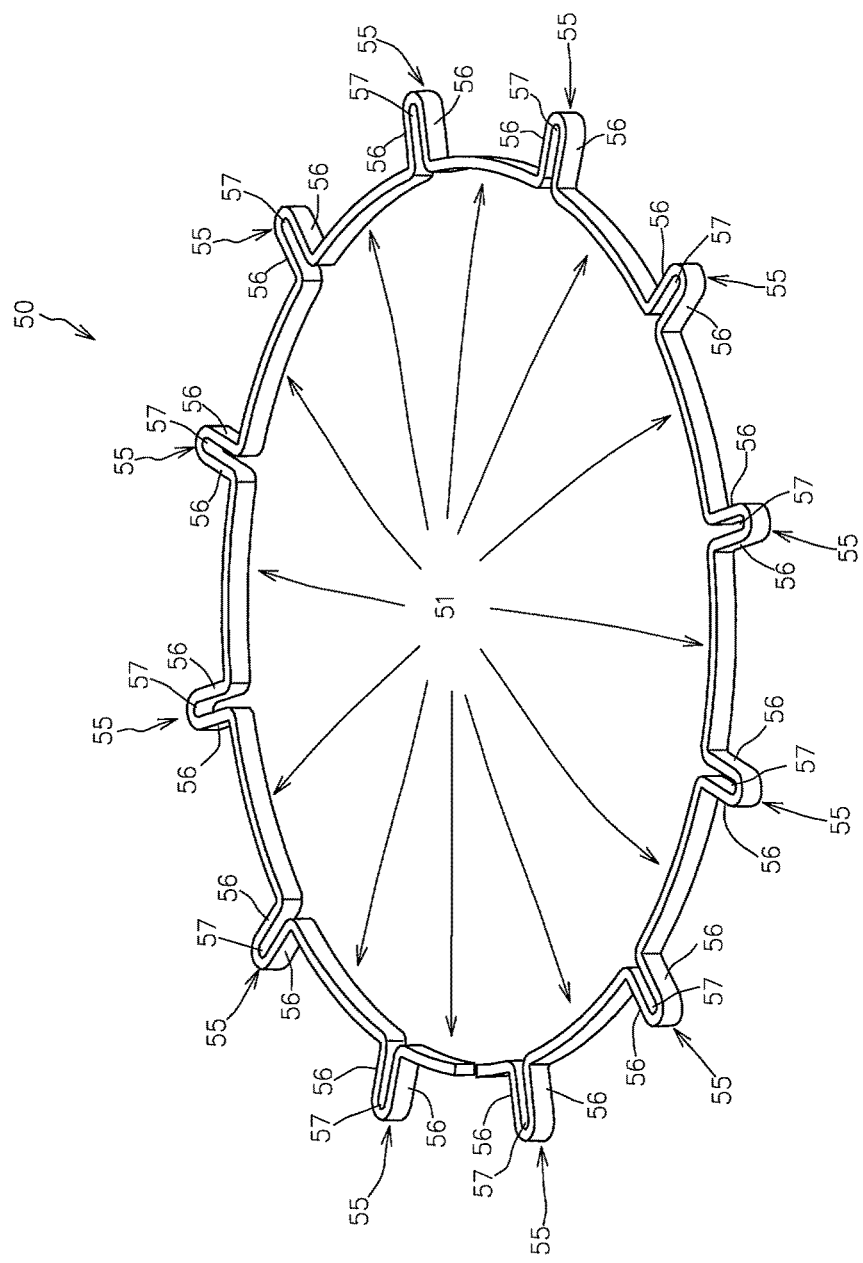

BUS RING UNIT

FIELD OF THE INVENTION

The present invention relates to a bus ring unit for electrically connecting the ends of stator coils wound around a stator in a rotary electric motor.

BACKGROUND ART

FIG. 12 shows a schematic transverse cross-sectional view of a rotary electric motor 200.

As shown in FIG. 12, the rotary electric motor 200 comprises a substantially cylindrical stator 201, a rotor (not shown in FIG. 12) disposed in the central opening of the stator 201, a plurality of stator coils 202 wound around a plurality of teeth of the stator 201, and a bus ring unit 210 for electrically connecting the ends of the stator coils 202.

The bus ring unit 210 has single-phase bus rings 211, 212, and 213 for electrically connecting in-phase stator coils 202, and a neutral-point bus ring 215 for electrically connecting electrically neutral points of the stator coils 202.

In FIG. 12, the single-phase bus rings include three bus rings, i.e., the U-phase bus ring 211, the V-phase bus ring 212, and the W-phase bus ring 213.

With respect to the bus ring unit 200, it is desired that the overall size both in the axial direction and in the radial direction of the stator is reduced and, moreover, it is desired to facilitate the connecting work for connecting the ends of the stator coils 202 to the single-phase bus rings 211, 212, and 213 and the neutral-point bus ring 215, while preventing the single-phase bus rings 211, 212, and 213 and the neutral-point bus ring 215 from interfering with each other.

For example, Patent Document 1 below discloses a bus ring unit comprising a holder that is made of insulating resin and disposed on one side in the axial direction of a stator, and first to third single-phase bus rings and a neutral-point bus ring that are attached to the holder.

The holder has first to third single-phase circular grooves that are open toward one side in the axial direction (the side facing away from the stator) and to which the first to third single-phase bus rings are respectively attached, and a neutral-point circular groove that is open toward the other side in the axial direction (the side facing the stator) and to which the neutral-point bus ring is attached.

The first single-phase bus ring has a first circular part with a first diameter and first connecting terminals extending radially outward from the first circular part.

The second single-phase bus ring has a second circular part with a second diameter that is smaller than the first diameter and second connecting terminals extending radially outward from the second circular part.

The third single-phase bus ring has a third circular part with a third diameter that is smaller than the second diameter and third connecting terminals extending radially outward from the third circular part.

The first single-phase circular groove has the first diameter to receive the first circular part.

The second single-phase circular groove has the second diameter to receive the second circular part, and the depth of the groove is smaller than the first single-phase circular groove.

The third single-phase circular groove has the third diameter to receive the third circular part, and the depth of the groove is smaller than the second single-phase circular groove.

In the first single-phase bus ring, the first connecting terminals are formed such that the distal ends are positioned in predetermined positions that are more radially outward than the holder when the first circular part is attached to the first circular groove.

In the second single-phase bus ring, the second connecting terminals are formed such that the second connecting terminals are displaced in the circumferential direction relative to the first connecting terminals and that the distal ends are positioned in substantially the same positions in the radial direction as the distal ends of the first connecting terminals when the second circular part is attached to the second circular groove.

In the third single-phase bus ring, the third connecting terminals are formed such that the third connecting terminals are displaced in the circumferential direction relative to the first and second connecting terminals and that the distal ends are positioned in substantially the same positions in the radial direction as the distal ends of the first and second connecting terminals when the third circular part is attached to the third circular groove.

Thus, concerning the above conventional bus ring unit, by providing the first to third single-phase bus rings so as to be mutually displaced in the axial direction, the connecting work for connecting the connecting terminals and the ends of the stator coils is facilitated, and by positioning the connecting terminals in the same positions in the radial direction, the overall size in the radial direction is reduced, while preventing the bus rings from interfering with each other.

However, in the above conventional bus ring unit, the first to third single-phase bus rings are provided so as to be mutually displaced in the axial direction as described above and, therefore, there is a problem in that the size in the axial direction is large.

Moreover, in the above conventional bus ring unit, the single-phase bus rings and the neutral-point bus ring are made from a round wire having a circular cross-section, and a dedicated holder as described above is needed to stably retain these rings. Such a dedicated holder also results in an increased overall size of the bus ring unit as well as increased costs.

PRIOR ART DOCUMENT

Patent Document

Patent document 1: Japanese Unexamined Patent Publication No. 2003-324887

DISCLOSURE OF THE INVENTION

The present invention has been conceived in view of the conventional art described above, and an object of the present invention is to provide a bus ring unit that electrically connects the ends of a plurality of stator coils attached to a stator and that is capable of having a reduced size both in the axial direction and in the radial direction of the stator.

In order to achieve the object, the present invention provides a bus ring unit for electrically connecting pairs of ends of a plurality of stator coils respectively wound around a plurality of teeth of a stator, the pairs of ends appearing on one side in an axial direction of the stator, the bus ring unit including: single-phase bus rings for electrically connecting first ends of the pairs of ends of in-phase coils among the stator coils, and a neutral-point bus ring for electrically connecting second ends of the pairs of ends of the stator coils. The neutral-point bus ring has a plurality of neutral-point-side rounded regions disposed at intervals in a circumferential direction so as to be positioned on a reference circle coaxial with the stator and at least partially positioned in a first axial position, and neutral-point-side connecting regions for connecting a circumferential edge of one neutral-point-side rounded region and an opposing circumferential edge of adjacent another neutral-point-side rounded region. The neutral-point-side connecting regions have a pair of neutral-point-side projections that extend radially outward from the circumferential edge of one neutral-point-side rounded region and the opposing circumferential edge of adjacent another neutral-point-side rounded region and are connected to each other at distal ends. The single-phase bus rings have a plurality of single-phase-side rounded regions disposed at intervals in the circumferential direction so as to be positioned on circles that are coaxial with the stator and have smaller diameters than the reference circle, and single-phase-side connecting regions for connecting a circumferential edge of one single-phase-side rounded region to an opposing circumferential edge of adjacent another single-phase-side rounded region. The single-phase-side rounded regions have a single-phase-side reference part positioned in the first axial position and a single-phase-side edge part that includes the circumferential edge and that is displaced in the circumferential direction and in the axial direction relative to the single-phase-side reference part such that the circumferential edge is displaced in the circumferential direction relative to the neutral-point-side connecting regions and positioned in a second axial position that is farther from the stator than the first axial position is in the axial direction. The single-phase-side connecting regions have a pair of single-phase-side projections that are positioned in the second axial position, extend radially outward from the circumferential edge of one single-phase-side rounded region and the opposing circumferential edge of adjacent another single-phase-side rounded region beyond portions of the neutral-point-side rounded regions positioned in the first axial position, and are connected to each other at distal ends.

The thus configured bus ring unit according to the present invention makes it possible to have a reduced size both in the axial direction and in the radial direction while facilitating connecting work for connecting the ends of the stator coils to the corresponding pair of neutral-point-side projections and also to the corresponding pair of single-phase-side projections.

Preferably, the single-phase-side rounded regions may have a single-phase-side transition part positioned between the single-phase-side reference part and the single-phase-side edge part, and the single-phase-side transition part may be positioned from the first axial position to the second axial position as it extends from the single-phase-side reference part toward the single-phase-side edge part.

In a case where the single-phase-side rounded region has the single-phase-side transition part, the single-phase bus rings preferably may have an electroconductive rectangular wire having a rectangular cross-sectional shape defined by a pair of long sides and a pair of short sides.

In the configuration, the single-phase-side reference part is formed such that the pair of long sides extend in the axial direction, the single-phase-side transition part is formed from the single-phase-side reference part by bending processing using a shaft that extends along the short sides as a bending fulcrum, the single-phase-side edge part is formed from the single-phase-side transition part by bending processing using a shaft that extends along the short sides as a bending fulcrum, while the pair of single-phase-side projections are respectively formed from the circumferential edges of one single-phase-side rounded region and another single-phase-side rounded region by bending processing using a shaft extending along the long sides as a bending fulcrum, and the distal ends of the pair of single-phase-side projections are connected to each other via portions undergone bending processing using a shaft extending along the long sides as a bending fulcrum.

In one embodiment, the neutral-point-side rounded regions and the neutral-point-side connecting regions are positioned in the first axial position.

In another embodiment, the neutral-point-side rounded regions may have a neutral-point-side reference part positioned in the first axial position and a neutral-point-side edge part that includes the circumferential edge and that is displaced in the axial direction relative to the neutral-point-side reference part such that the circumferential edge is positioned in the second axial position.

In this embodiment, the neutral-point-side connecting regions may be positioned in the second axial position.

In the embodiment where the neutral-point-side rounded regions have a neutral-point-side edge part including the circumferential edge positioned in the second axial position, the neutral-point-side rounded regions preferably have a neutral-point-side transition part positioned between the neutral-point-side reference part and the neutral-point-side edge part, and the neutral-point-side transition part is positioned from the first axial position to the second axial position as it extends from the neutral-point-side reference part toward the neutral-point-side edge part.

In the configuration where the neutral-point-side rounded regions preferably have the neutral-point-side transition part, the neutral-point bus ring preferably have an electroconductive rectangular wire having a rectangular cross-sectional shape defined by a pair of long sides and a pair of short sides.

In the preferable configuration, the neutral-point-side reference part is formed such that the pair of long sides extend in the axial direction, the neutral-point-side transition part is formed from the neutral-point-side reference part by bending processing using a shaft that extends along the short sides as a bending fulcrum, and the neutral-point-side edge part is formed from the neutral-point-side transition part by bending processing using a shaft that extends along the short sides as a bending fulcrum, while the pair of neutral-point-side projections are respectively formed from the circumferential edges of one neutral-point-side rounded region and another neutral-point-side rounded region by bending processing using a shaft extending along the long sides as a bending fulcrum, and the distal ends of the pair of neutral-point-side projections are connected to each other via portions undergone bending processing using a shaft extending along the long sides as a bending fulcrum.

In any one of the above configurations, the pairs of neutral-point-side projections and the pairs of single-phase-side projections all may have a U-shape as viewed from above to be spaced apart from a proximal side to a distal side to have a width that allows the ends of the stator coils to enter.

Alternatively, the pairs of neutral-point-side projections and the pairs of single-phase-side projections all may have an Ω-shape as viewed from above to be close to each other over a predetermined distance from a proximal side toward a distal side such that the ends of the stator coils cannot enter and spaced apart to have a width that allows the ends of the stator coils to enter on the distal side.

In one embodiment, the single-phase bus rings may include first to third single-phase bus rings.

The first single-phase bus ring has a plurality of first single-phase-side rounded regions disposed at intervals in the circumferential direction so as to be positioned on a first circle that is coaxial with the stator and that has a smaller diameter than the reference circle, and first single-phase-side connecting regions for connecting a circumferential edge of one first single-phase-side rounded region to an opposing circumferential edge of adjacent another first single-phase-side rounded region. The first single-phase-side rounded regions have a first single-phase-side reference part positioned in the first axial position and a first single-phase-side edge part that includes the circumferential edge and that is displaced in the circumferential direction and in the axial direction relative to the first single-phase-side reference part such that the circumferential edge is displaced in the circumferential direction relative to the neutral-point-side connecting regions and positioned in the second axial position. The first single-phase-side connecting regions have a pair of first single-phase-side projections that are positioned in the second axial position, extend radially outward from the circumferential edge of said one first single-phase-side rounded region and the opposing circumferential edge of said adjacent another first single-phase-side rounded region beyond portions of the neutral-point-side rounded regions positioned in the first axial position, and are connected to each other at distal ends.

The second single-phase bus ring has a plurality of second single-phase-side rounded regions disposed at intervals in the circumferential direction so as to be positioned on a second circle that is coaxial with the stator and that has a smaller diameter than the first circle, and second single-phase-side connecting regions for connecting a circumferential edge of one second single-phase-side rounded region to an opposing circumferential edge of adjacent another second single-phase-side rounded region. The second single-phase-side rounded regions have a second single-phase-side reference part positioned in the first axial position and a second single-phase-side edge part that includes the circumferential edge and that is displaced in the circumferential direction and in the axial direction relative to the second single-phase-side reference part such that the circumferential edge is displaced in the circumferential direction relative to the neutral-point-side connecting regions and the first single-phase-side connecting regions and positioned in the second axial position. The second single-phase-side connecting regions have a pair of second single-phase-side projections that are positioned in the second axial position, extend radially outward from the circumferential edge of said one second single-phase-side rounded region and the opposing circumferential edge of said adjacent another second single-phase-side rounded region beyond portions of the neutral-point-side rounded regions and the first single-phase-side rounded regions positioned in the first axial position, and are connected to each other at distal ends.

The third single-phase bus ring has a plurality of third single-phase-side rounded regions disposed at intervals in the circumferential direction so as to be positioned on a third circle that is coaxial with the stator and that has a smaller diameter than the second circle, and third single-phase-side connecting regions for connecting a circumferential edge of one third single-phase-side rounded region to an opposing circumferential edge of adjacent another third single-phase-side rounded region. The third single-phase-side rounded regions have a third single-phase-side reference part positioned in the first axial position and a third single-phase-side edge part that includes the circumferential edge and that is displaced in the circumferential direction and in the axial direction relative to the third single-phase-side reference part such that the circumferential edge is displaced in the circumferential direction relative to the neutral-point-side connecting regions, the first single-phase-side connecting regions, and the second single-phase-side connecting regions, and positioned in the second axial position. The third single-phase-side connecting regions have a pair of third single-phase-side projections that are positioned in the second axial position, extend radially outward from the circumferential edge of said one third single-phase-side rounded region and the opposing circumferential edge of said adjacent another third single-phase-side rounded region beyond portions of the neutral-point-side rounded regions, the first single-phase-side rounded regions, and the second single-phase-side rounded regions positioned in the first axial position, and are connected to each other at distal ends.

In a case where the single-phase bus rings include first to third single-phase bus rings, lengths of the pairs of neutral-point-side projections, the pairs of first single-phase-side projections, the pairs of second single-phase-side projections, and the pairs of third single-phase-side projections are preferably set such that distal ends are positioned in the same radial position.

BRIEF DESCRIPTION OF THE DRAWINGS

FIG. 2 is a plan view of the bus ring unit shown in FIG. 1.

FIG. 3 is a front view of the bus ring unit shown in FIGS. 1 and 2.

FIG. 4 is a perspective view of a neutral-point bus ring of the bus ring unit shown in FIGS. 1 to 3.

EMBODIMENT FOR CARRYING OUT THE INVENTION

First Embodiment

Below, one embodiment of a bus ring unit according to the present invention will now be described with reference to the appended drawings.

Figure 1:
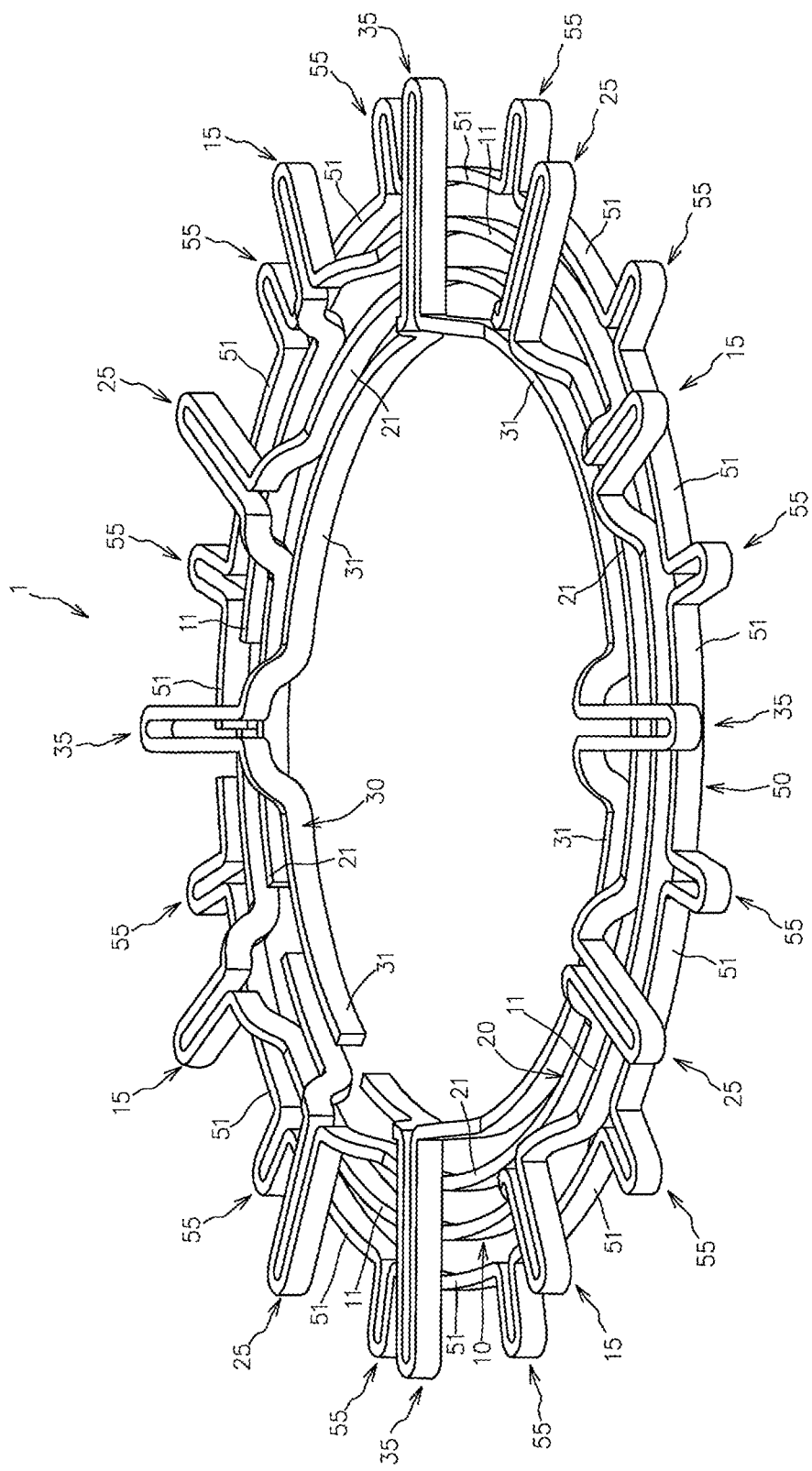
FIG. 1 is a perspective view of a bus ring unit according to one embodiment of the present invention.

FIGS. 1 to 3 respectively show a perspective view, a plan view, and a front view of a bus ring unit 1 according to this embodiment.

The bus ring unit 1 is a component for electrical connection with the ends of a plurality of stator coils (not shown) attached to a stator (not shown) to transmit externally supplied electric power to the stator coils.

Specifically, the stator has a plurality of teeth (not shown) disposed at intervals in the circumferential direction. With the stator coils being wound around the teeth, a pair of ends of each stator coil appear on one side in the axial direction of the stator.

As shown in FIGS. 1 to 3, the bus ring unit 1 comprises a single-phase bus ring unit for electrically connecting first ends of in-phase coils among the stator coils (hereinafter referred to as single-phase-side ends), and a neutral-point bus ring 50 for electrically connecting second ends of the stator coils (hereinafter referred to as neutral-point-side ends 90 (see FIG. 5 below)).

In the bus ring unit 1 according to this embodiment, the single-phase bus rings include first to third single-phase bus rings 10, 20, and 30 as shown in FIGS. 1 to 3.

The first single-phase bus ring 10 electrically connects single-phase-side ends of stator coils having any one of the U phase, V phase, and W phase (e.g., U phase), and the second and third single-phase bus rings 20, 30 electrically connect single-phase-side ends of stator coils having one phase (e.g., V phase) and the other phase (e.g, W phase), respectively, that are different from the phase connected by the first single-phase bus ring 10 among the U phase, V phase, and W phase.

FIG. 4 shows a perspective view of the neutral-point bus ring 50.

As shown in FIGS. 1 to 4, the neutral-point bus ring 50 has a plurality of neutral-point-side rounded regions 51 and a plurality of neutral-point-side connecting regions 55.

The neutral-point-side rounded regions 51 are disposed at intervals in the circumferential direction with reference to the axis of the stator so as to be positioned on a reference circle that is coaxial with the stator.

The neutral-point-side rounded regions 51 are at least partially positioned in a first axial position with respect to the position in the axial direction of the stator.

In this embodiment, the neutral-point-side rounded regions 51 are entirely positioned in the first axial position as shown in FIGS. 1 to 4.

The neutral-point-side connecting regions 55 connect a circumferential edge of one neutral-point-side rounded region 51 and the opposing circumferential edge of adjacent another neutral-point-side rounded region 51, and serve as neutral-point connecting terminals to which the neutral-point-side ends 90 (see FIG. 5 below) of the stator coils are connected.

Specifically, as shown in FIGS. 1 to 4, the neutral-point-side connecting regions 55 have a pair of neutral-point-side projections 56 that extend radially outward from a circumferential edge of said one neutral-point-side rounded region 51 and the opposing circumferential edge of said adjacent another neutral-point-side rounded region 51 and are connected to each other at distal ends.

As described above, in this embodiment, the neutral-point-side rounded regions 51 including the circumferential edges are entirely positioned in the first axial position.

The pairs of neutral-point-side projections 56 extending from the circumferential edges are also positioned in the first axial position.

Figure 5A:
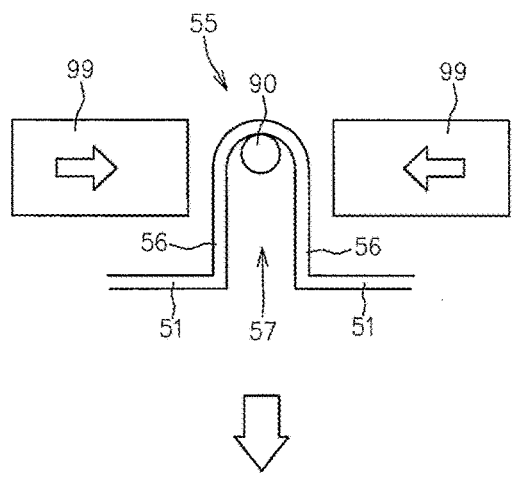
FIGS. 5A and 5B are schematic diagrams showing a process for a connecting neutral-point-side end of a stator coil to a neutral-point-side connecting region of the neutral-point bus ring.
Figure 5B:
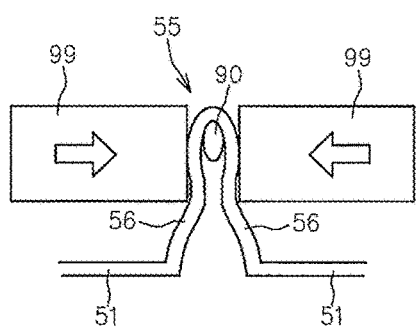

FIGS. 5(*a*) and 5(*b*) show schematic diagrams of a process for connecting the neutral-point-side ends of the stator coils to the neutral-point-side connecting regions 55.

As shown in FIGS. 1, 2, 4, and 5, the pairs of neutral-point-side projections 56 have a space 57 therebetween that allows the insertion of the neutral-point-side end 90.

As shown in FIG. 5, with the neutral-point-side end 90 being inserted in the space 57 (FIG. 5(*a*)), sandwiching the pair of neutral-point-side projections 56 with a pair of electrodes 99 makes it possible to electrically connect the neutral-point-side end 90 to the neutral-point-side connecting region 55 by fusing (FIG. 5(*b*)).

According to this configuration, it is possible to position the neutral-point-side end 90 in the space 57 not only by relatively moving the neutral-point bus ring 50 in the axial direction of the stator relative to the neutral-point-side end 90, but also by relatively moving the neutral-point bus ring 50 in the radial direction with reference to the central axis of the stator relative to the neutral-point-side end 90.

In this embodiment, the pairs of neutral-point-side projections 56 have a U-shape as viewed from above so as to have, from the proximal side to the distal side, the space 57 with a width that allows the neutral-end-side end 90 to enter as shown in FIG. 2 and other drawings.

Alternatively, it is also possible to form an Ω-shape as viewed from above that each pair of neutral-point-side projections 56 are close to each other to such an extent that the neutral-point-side end 90 (see FIG. 5) cannot enter over a specific distance from the proximal side toward the distal side while the space 57 is provided on the distal side.

According to this configuration, it is possible to effectively prevent the positional shift of the neutral-point-side end 90 in the radial direction with reference to the axis of the stator when the neutral-point-side end 90 is inserted into the space 57 to be connected to the neutral-point-side connecting region 55 by fusing.

The bus ring unit 1 according to this embodiment has twelve neutral-point-side connecting regions 55 for electrically connecting twelve stator coils.

Figure 6:
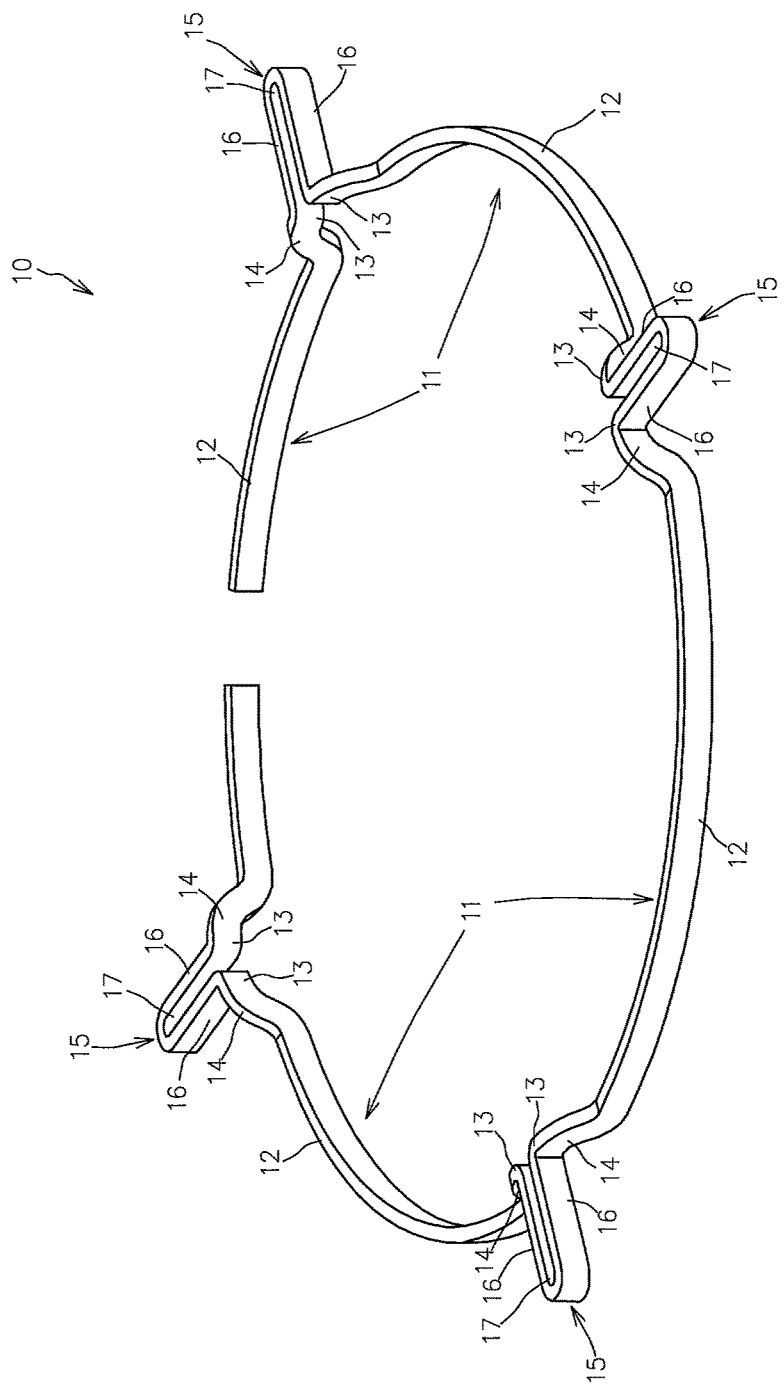
FIG. 6 is a perspective view of a first single-phase bus ring of the bus ring unit shown in FIGS. 1 to 3.
Figure 7:
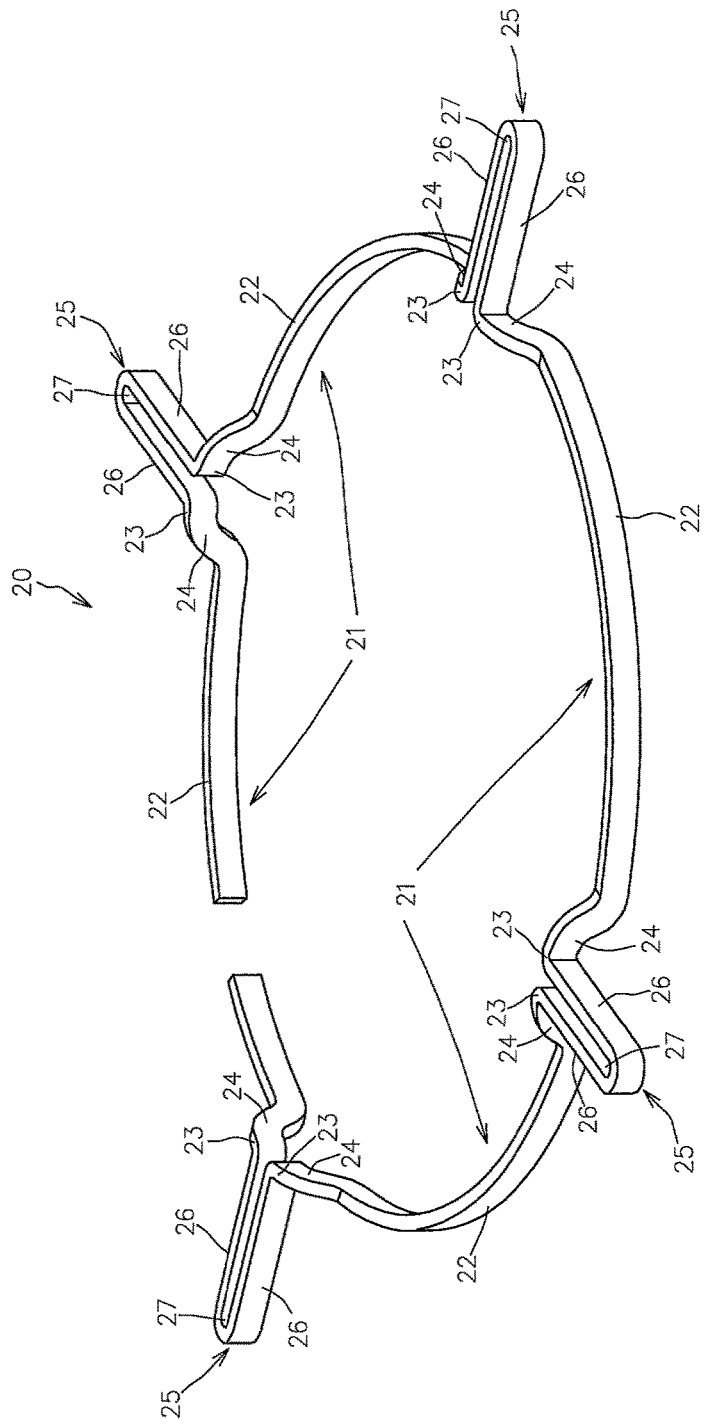
FIG. 7 is a perspective view of a second single-phase bus ring of the bus ring unit shown in FIGS. 1 to 3.
Figure 8:
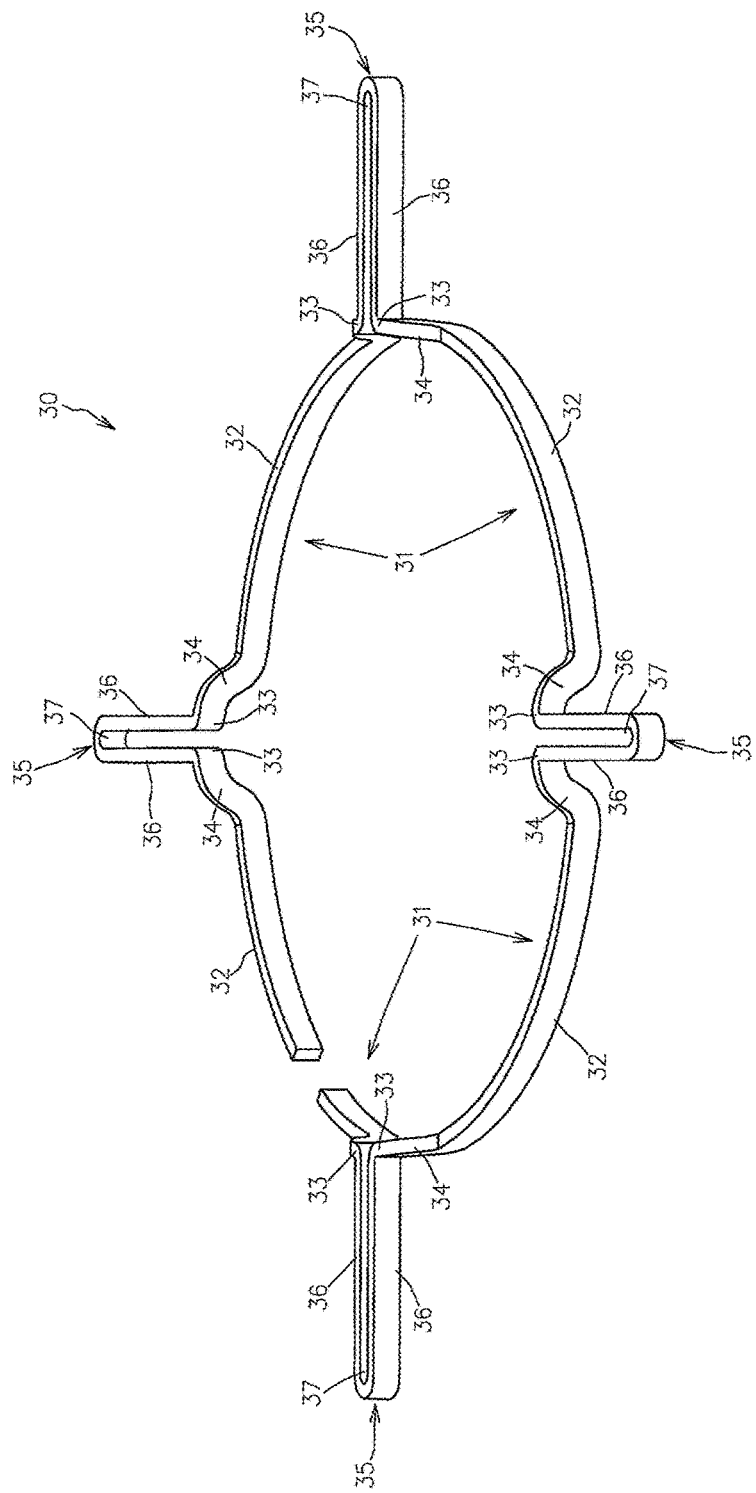
FIG. 8 is a perspective view of a third single-phase bus ring of the bus ring unit shown in FIGS. 1 to 3

FIGS. 6 to 8 show perspective views of the first to third single-phase bus rings 10, 20, and 30, respectively.

As shown in FIGS. 1 to 3 and 6, the first single-phase bus ring 10 has a plurality of first single-phase-side rounded regions 11 and a plurality of first single-phase-side connecting regions 15.

The first single-phase-side rounded regions 11 are disposed at intervals in the circumferential direction so as to be positioned coaxially with the stator and on a first circle having a smaller diameter than the reference circle.

The first single-phase-side rounded regions 11 are formed such that the circumferential edges are displaced in the circumferential direction relative to the neutral-point-side connecting regions 55 and are positioned in a second axial position that is farther from the stator than the first axial position is in the axial direction.

Specifically, as shown in FIG. 6 and other drawings, the first single-phase-side rounded regions 11 have a first single-phase-side reference part 12 positioned in the first axial position and a first single-phase-side edge part 13 that includes the circumferential edge and that is displaced in the circumferential direction and in the axial direction relative to the first single-phase-side reference part 12 such that the circumferential edge is displaced in the circumferential direction relative to the neutral-point-side connecting regions 55 and positioned in the second axial position that is farther from the stator than the first axial position is in the axial direction.

As shown in FIG. 6 and other drawings, in this embodiment, the first single-phase-side rounded regions 11 have a first single-phase-side transition part 14 between the first single-phase-side reference part 12 and the first single-phase-side edge part 13.

The first single-phase-side transition part 14 is sloped from the first single-phase-side reference part 12 toward the first single-phase-side edge part 13 so as to be positioned from the first axial position to the second axial position as it comes close to the first single-phase-side edge part 13.

In this embodiment, the first single-phase-side reference part 12 exists over a predetermined distance in the circumferential direction as shown in FIG. 6, but the present invention is not limited to this configuration.

For example, the first single-phase-side reference part 12 can be configured to exist only in one point in the circumferential direction.

The first single-phase-side connecting regions 15 connect a circumferential edge of one first single-phase-side rounded region 11 and a circumferential edge of adjacent another first single-phase-side rounded region 11, and serve as first-phase connecting terminals to which the single-phase-side ends of stator coils having one phase (e.g., U phase) among the stator coils are connected.

Specifically, as shown in FIGS. 1 to 3 and 6, the first single-phase-side connecting regions 15 have a pair of first single-phase-side projections 16 that respectively project radially outward from a circumferential edge of said one first single-phase-side rounded region 11 and the opposing circumferential edge of said adjacent another first single-phase-side rounded region 11.

As described above, the circumferential edges of the first single-phase-side rounded regions 11 are displaced in the circumferential direction relative to the neutral-point-side connecting regions 55 and are positioned in the second axial position in the axial direction.

The pairs of first single-phase-side projections 16 extending radially outward from the opposing circumferential edges are positioned in the second axial position, extend radially outward beyond the portions of the neutral-point-side rounded regions 51 positioned in the first axial position, and connected to each other at the distal ends.

As shown in FIG. 6 and other drawings, the pairs of first single-phase-side projections 16 have a space 17 therebetween into which the single-phase-side end of a stator coil of the corresponding phase can be inserted.

According to this configuration, with the corresponding single-phase-side end being inserted in the space 17, sandwiching the pair of first single-phase-side projections 16 with a pair of electrodes makes it possible to electrically connect the single-phase-side end to the first single-phase-side connecting region 15 by fusing, as in the neutral-point-side connecting regions 55.

In this embodiment, the pairs of first single-phase-side projections 16 have a U-shape as viewed from above so as to have, from the proximal side to the distal side, the space 17 with a width that allows the single-phase-side end to enter as shown in FIG. 2 and other drawings.

According to this configuration, it is possible to position the single-phase-side end in the space 17 not only by relatively moving the first single-phase bus ring 10 in the axial direction of the stator relative to the single-phase-side end, but also by relatively moving the first single-phase bus ring 10 in the radial direction with reference to the central axis of the stator relative to the single-phase-side end.

Alternatively, it is also possible to form an Ω-shape as viewed from above that each pair of first single-phase-side projections 16 are close to each other to such an extent that the single-phase-side end cannot enter over a specific distance from the proximal side toward the distal side while the space 17 is provided on the distal side.

According to this configuration, it is possible to effectively prevent the positional shift of the single-phase-side end in the radial direction with reference to the axis of the stator when the single-phase-side end is inserted into the space 17 to be connected to the first single-phase-side connecting region 15 by fusing.

As shown in FIGS. 1 to 3 and 7, the second single-phase bus ring 20 has a plurality of second single-phase-side rounded regions 21 and a plurality of second single-phase-side connecting regions 25.

The second single-phase-side rounded regions 21 are disposed at intervals in the circumferential direction so as to be positioned coaxially with the stator and on a second circle having a smaller diameter than the first circle.

The second single-phase-side rounded regions 21 are formed such that the circumferential edges are displaced in the circumferential direction relative to the neutral-point-side connecting regions 55 and the first single-phase-side rounded regions 15 and are positioned in the second axial position in the axial direction.

Specifically, as shown in FIG. 7 and other drawings, the second single-phase-side rounded regions 21 have a second single-phase-side reference part 22 positioned in the first axial position and a second single-phase-side edge part 23 that includes the circumferential edge and that is displaced in the circumferential direction and in the axial direction relative to the second single-phase-side reference part 22 such that the circumferential edge is displaced in the circumferential direction relative to the neutral-point-side connecting regions 55 and the first single-phase-side connecting regions 15 and is positioned in the second axial position in the axial direction.

As shown in FIG. 7 and other drawings, in this embodiment, the second single-phase-side rounded regions 21 have a second single-phase-side transition part 24 between the second single-phase-side reference part 22 and the second single-phase-side edge part 23.

The second single-phase-side transition part 24 is sloped from the second single-phase-side reference part 22 toward the second single-phase-side edge part 23 so as to be positioned from the first axial position to the second axial position as it comes close to the second single-phase-side edge part 23.

In this embodiment, the second single-phase-side reference part 22 exists over a predetermined distance in the circumferential direction as shown in FIG. 7, but the present invention is not limited to this configuration.

For example, the second single-phase-side reference part 22 can be configured to exist only in one point in the circumferential direction.

The second single-phase-side connecting regions 25 connect a circumferential edge of one second single-phase-side rounded region 21 and a circumferential edge of adjacent another second single-phase-side rounded region 21, and serve as second-phase connecting terminals to which the single-phase-side ends of stator coils having another phase (e.g., V phase) among the stator coils are connected.

Specifically, as shown in FIGS. 1 to 3 and 7, the second single-phase-side connecting regions 25 have a pair of second single-phase-side projections 26 that respectively project radially outward from a circumferential edge of said one second single-phase-side rounded region 21 and the opposing circumferential edge of said adjacent another second single-phase-side rounded region 21.

As described above, the circumferential edges of the second single-phase-side rounded regions 21 are displaced in the circumferential direction relative to the neutral-point-side connecting regions 55 and the first single-phase-side connecting regions 15 and are positioned in the second axial position in the axial direction.

The pairs of second single-phase-side projections 26 extending radially outward from the opposing circumferential edges are positioned in the second axial position, extend radially outward beyond the portions of the neutral-point-side rounded regions 51 and the first single-phase-side rounded regions 11 positioned in the first axial position, and connected to each other at the distal ends.

As shown in FIG. 7 and other drawings, the pairs of second single-phase-side projections 26 have a space 27 therebetween into which the single-phase-side end of a stator coil of the corresponding phase can be inserted.

According to this configuration, with the corresponding single-phase-side end being inserted in the space 27, sandwiching the pair of second single-phase-side projections 26 with a pair of electrodes makes it possible to electrically connect the single-phase-side end to the second single-phase-side connecting region 25 by fusing, as in the neutral-point-side connecting regions 55 and the first single-phase-side connecting regions 15.

In this embodiment, the pairs of second single-phase-side projections 26 have a U-shape as viewed from above so as to have, from the proximal side to the distal side, the space 27 with a width that allows the single-phase-side end to enter as shown in FIG. 2 and other drawings.

According to this configuration, it is possible to position the single-phase-side end in the space 27 not only by relatively moving the second single-phase bus ring 20 in the axial direction of the stator relative to the single-phase-side end, but also by relatively moving the second single-phase bus ring 20 in the radial direction with reference to the central axis of the stator relative to the single-phase-side end.

Alternatively, it is also possible to form an Ω-shape as viewed from above that each pair of second single-phase-side projections 26 are close to each other to such an extent that the single-phase-side end cannot enter over a specific distance from the proximal side toward the distal side while the space 27 is provided on the distal side.

According to this configuration, it is possible to effectively prevent the positional shift of the single-phase-side end in the radial direction with reference to the axis of the stator when the single-phase-side end is inserted into the space 27 to be connected to the second single-phase-side connecting region 25 by fusing.

As shown in FIGS. 1 to 3 and 8, the third single-phase bus ring 30 has a plurality of third single-phase-side rounded regions 31 and a plurality of third single-phase-side connecting regions 35.

The third single-phase-side rounded regions 31 are disposed at intervals in the circumferential direction so as to be positioned coaxially with the stator and on a third circle having a smaller diameter than the second circle.

The third single-phase-side rounded regions 31 are formed such that the circumferential edges are displaced in the circumferential direction relative to the neutral-point-side connecting regions 55, the first single-phase-side connecting regions 15 and the second single-phase-side connecting regions 25, and are positioned in the second axial position in the axial direction.

Specifically, as shown in FIG. 8 and other drawings, the third single-phase-side rounded regions 31 have a third single-phase-side reference part 32 positioned in the first axial position and a third single-phase-side edge part 33 that includes the circumferential edge and that is displaced in the circumferential direction and in the axial direction relative to the third single-phase-side reference part 32 such that the circumferential edge is displaced in the circumferential direction relative to the neutral-point-side connecting regions 55, the first single-phase-side connecting regions 15 and the second single-phase-side connecting regions 25, and are positioned in the second axial position in the axial direction.

As shown in FIG. 8 and other drawings, in this embodiment, the third single-phase-side rounded regions 31 have a third single-phase-side transition part 34 between the third single-phase-side reference part 32 and the third single-phase-side edge part 33.

The third single-phase-side transition part 34 is sloped from the third single-phase-side reference part 32 toward the third single-phase-side edge part 33 so as to be positioned from the first axial position to the second axial position as it comes close to the third single-phase-side edge part 33.

In this embodiment, the third single-phase-side reference part 32 exists over a predetermined distance in the circumferential direction as shown in FIG. 8, but the present invention is not limited to this configuration.

For example, the third single-phase-side reference parts 32 can be configured to exist only in one point in the circumferential direction.

The third single-phase-side connecting regions 35 connect a circumferential edge of one third single-phase-side rounded region 31 and a circumferential edge of adjacent another third single-phase-side rounded region 31, and serve as third-phase connecting terminals to which the single-phase-side ends of stator coils having yet another phase (e.g., W phase) among the stator coils are connected.

Specifically, as shown in FIGS. 1 to 3 and 8, the third single-phase-side connecting regions 35 have a pair of third single-phase-side projections 36 that respectively project radially outward from a circumferential edge of said one third single-phase-side rounded region 31 and the opposing circumferential edge of said adjacent another third single-phase-side rounded region 31.

As described above, the circumferential edges of the third single-phase-side rounded regions 31 are displaced in the circumferential direction relative to the neutral-point-side connecting regions 55, the first single-phase-side connecting regions 15 and the second single-phase-side connecting regions 25, and are positioned in the second axial position in the axial direction.

The pairs of third single-phase-side projections 36 extending radially outward from the opposing circumferential edges are positioned in the second axial position, extend radially outward beyond the portions of the neutral-point-side rounded regions 51, the first single-phase-side rounded regions 11 and the second single-phase-side rounded regions 21 positioned in the first axial position, and connected to each other at the distal ends.

As shown in FIG. 8 and other drawings, the pairs of third single-phase-side projections 36 have a space 37 therebetween into which the single-phase-side end of a stator coil of the corresponding phase can be inserted.

According to this configuration, with the corresponding single-phase-side end being inserted in the space, sandwiching the pair of third single-phase-side projections 36 with a pair of electrodes makes it possible to electrically connect the single-phase-side end to the third single-phase-side connecting region 35 by fusing, as in the neutral-point-side connecting regions 55, the first single-phase-side connecting regions 15, and the second single-phase-side connecting regions 25.

In this embodiment, the pairs of third single-phase-side projections 36 have a U-shape as viewed from above so as to have, from the proximal side to the distal side, the space 37 with a width that allows the single-phase-side end to enter as shown in FIG. 2 and other drawings.

According to this configuration, it is possible to position the single-phase-side end in the space 37 not only by relatively moving the third single-phase bus ring 30 in the axial direction of the stator relative to the single-phase-side end, but also by relatively moving the third single-phase bus ring 30 in the radial direction with reference to the central axis of the stator relative to the single-phase-side end.

Alternatively, it is also possible to form an Ω-shape as viewed from above that each pair of third single-phase-side projections 36 are close to each other to such an extent that the single-phase-side end cannot enter over a specific distance from the proximal side toward the distal side while the space 37 is provided on the distal side.

According to this configuration, it is possible to effectively prevent the positional shift of the single-phase-side end in the radial direction with reference to the axis of the stator when the single-phase-side end is inserted into the space 37 to be connected to the third single-phase-side connecting region 35 by fusing.

Thus, in the bus ring unit 1 according to this embodiment, the neutral-point-side rounded regions 51 are disposed on a reference circle and at least partially positioned in the first axial position, and the neutral-point-side connecting regions 55 that connect the opposing circumferential edges of adjacent neutral-point-side rounded regions 51 have the pair of neutral-point-side projections 56 that extend radially outward from the circumferential edge of said one neutral-point-side rounded region 51 and the opposing circumferential edge of said adjacent another neutral-point-side rounded region 51 and are connected to each other at the distal ends.

On the other hand, the single-phase-side rounded regions 11, 21, and 31 are disposed on circles having smaller diameters than the reference circle and at least partially positioned in the first axial position, and the circumferential edges are displaced in the circumferential direction relative to the neutral-point-side connecting regions 55 and are positioned in the second axial position that is farther from the stator than the first axial position is in the axial direction.

The single-phase-side connecting regions 15, 25, and 35 that connect the opposing circumferential edges of adjacent single-phase-side rounded regions 11, 21, and 31 have pairs of single-phase-side projections 16, 26, and 36 that are positioned in the second axial position and extend radially outward from the circumferential edges of the single-phase-side rounded regions 11, 21, and 31 and the opposing circumferential edges of the adjacent single-phase-side rounded regions 11, 21, and 31 to exceed the portions of the neutral-point-side rounded regions 51 positioned in the first axial position, and connected to each other at the distal ends.

According to this configuration, it is possible to reduce the overall size, especially the size in the axial direction, of the bus ring unit 1 including the single-phase bus rings 10, 20, and 30 and the neutral-point bus ring 50 while preventing the single-phase bus rings 10, 20, and 30 and the neutral-point bus ring 50 from interfering each other.

Furthermore, the pairs of neutral-point-side projections 56 and the pairs of single-phase-side projections 16, 26, and 36 that serve as connecting terminals for connection with the ends of the stator coils are displaced in the circumferential direction relative to each other, and the distal ends extend radially outward beyond the reference circle.

Therefore, it is possible to facilitate the connecting work for connecting the stator coils to the single-phase bus rings 10, 20, and 30 and the neutral-point bus ring 50.

Figure 9:
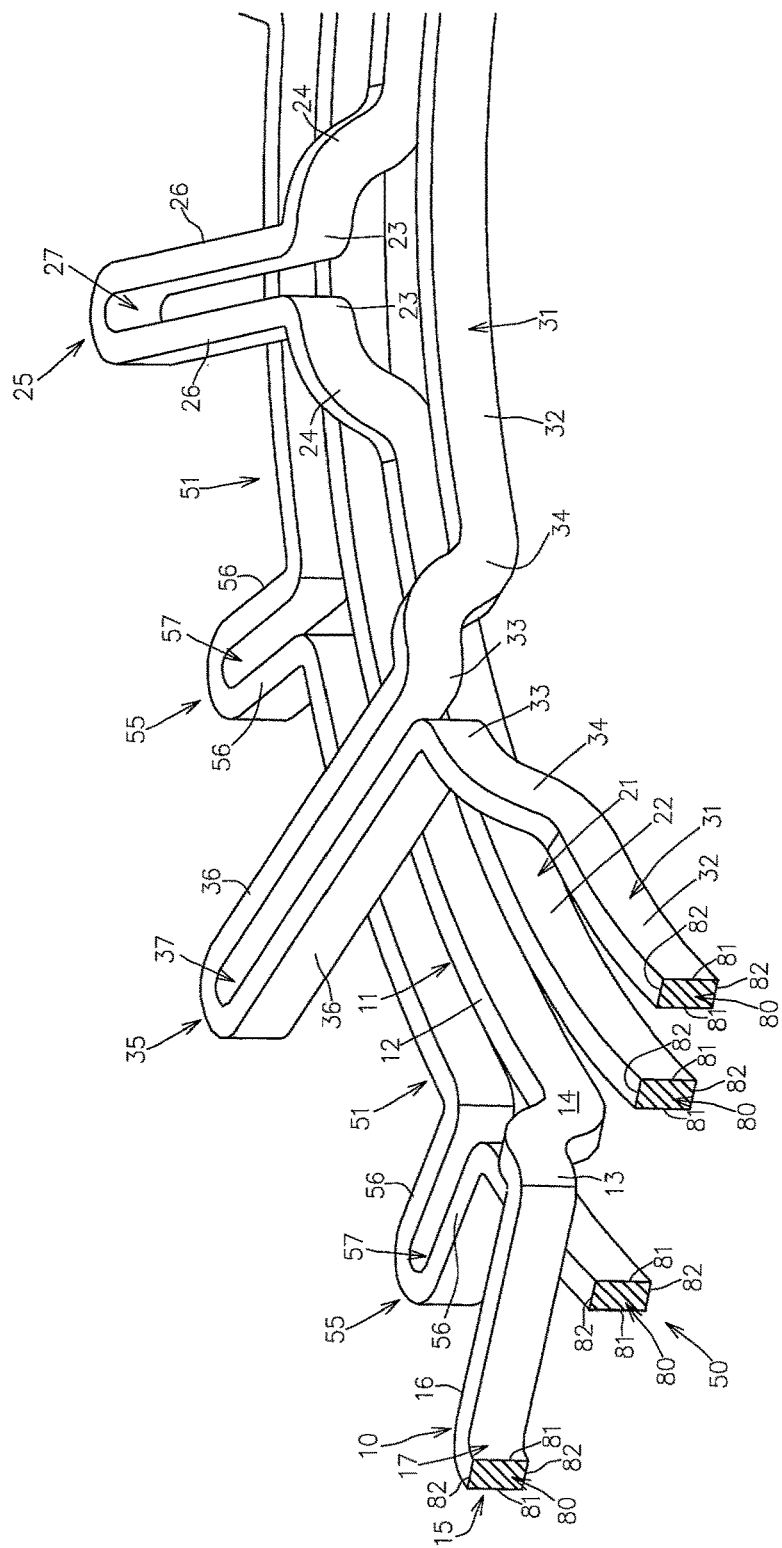
FIG. 9 is a cross-sectional view taken along line IX-IX in FIG. 2.

FIG. 9 shows a cross-sectional view taken along line IX-IX in FIG. 2.

In this embodiment, the single-phase-side edge parts 13, 23, and 33 are positioned in the second axial position via the single-phase-side transition parts 14, 24, and 34 as shown in FIG. 9 and as described above.

According to this configuration, performing forming processing on an electroconductive rectangular wire 80 having a rectangular cross-sectional shape defined by a pair of long sides 81 and a pair of short sides 82 makes it possible, without shearing processing or pressing processing, to form the single-phase bus rings 10, 20, and 30 in which the pairs of single-phase-side projections 16, 26, and 36 face each other, with the pairs of single-phase-side projections 16, 26, and 36 being positioned in the second axial position and the long sides 81 extending in the axial direction.

Specifically, as shown in FIG. 9, the single-phase-side reference parts 12, 22, and 32 are formed such that the pairs of long sides 81 extend in the axial direction, the single-phase-side transition parts 14, 24, and 34 are formed from the corresponding single-phase-side reference parts 12, 22, and 32 by bending processing using shafts that extend along the short sides 82 as bending fulcrums, and the single-phase-side edge parts 13, 23, and 33 are formed from the corresponding single-phase-side transition parts 14, 24, and 34 by bending processing using shafts that extend along the short sides 82 as bending fulcrums.

The single-phase-side projections 16, 26, and 36 are formed from the circumferential edges of the corresponding single-phase-side rounded regions 11, 21, and 31 by bending processing using shafts that extend along the long sides 81 as bending fulcrums, and the distal ends of the pairs of the single-phase-side projections 16, 26, and 36 are connected to each other via portions undergone bending processing using shafts that extend along the long sides 81 as bending fulcrum.

Disposing the pairs of single-phase-side projections 16, 26, and 36 to face each other such that the long sides 81 extend in the axial direction makes it easy to perform fusing in which the pairs of single-phase-side projections 16, 26, and 36 having the ends of the stator coils placed therebetween are compressed by a pair of electrodes to electrically connect the ends of the stator coils to the pairs of single-phase-side projections 16, 26, and 36.

In this embodiment, as shown in FIG. 9, in order to form the neutral-point bus ring 50 as well, the electroconductive rectangular wire 80 having a rectangular cross-sectional shape defined by a pair of long sides 81 and a pair of short sides 82 is used to perform forming processing such that the long sides 81 extend in the axial direction when the neutral-point bus ring 50 is installed.

Preferably, as shown in FIG. 2, the distal ends of the pairs of neutral-point-side projections 56, the pairs of first single-phase-side projections 16, the pairs of second single-phase-side projections 26, and the pairs of third single-phase-side projections 36 can be positioned in the same radial position.

Specifically, the pairs of neutral-point-side projections 56 are formed such that the distal ends are positioned on a predetermined radius with reference to the aforementioned axis, the pairs of first single-phase-side projections 16 are formed to be longer than the neutral-point-side projections 56 such that the distal ends are positioned on the predetermined radius, the pairs of second single-phase-side projections 26 are formed to be longer than the first single-phase-side projections 16 such that the distal ends are positioned on the predetermined radius, and the pairs of third single-phase-side projections 36 are formed to be longer than the second single-phase-side projections 26 such that the distal ends are positioned on the predetermined radius.

According to this configuration, it is possible to efficiently perform the connecting work for connecting the ends of the stator coils to the pairs of neutral-point-side projections 56, the pairs of first single-phase-side projections 16, the pairs of second single-phase-side projections 26, and the pairs of third single-phase-side projections 36.

By attaching the first to third single-phase bus rings 10, 20, and 30 and the neutral-point bus ring 50 to a dedicated insulating holder (not shown), it is possible to secure their relative positions relative to each other, and it is also possible to secure their relative positions relative to each other by insulating tape.

In the latter case, at least the portions of the bus rings 10, 20, 30, and 50 that come into contact with each other are coated with an insulating coating.

Second Embodiment

Below, another embodiment of the bus ring unit according to the present invention will now be described with reference to the attached drawings.

Figure 10:
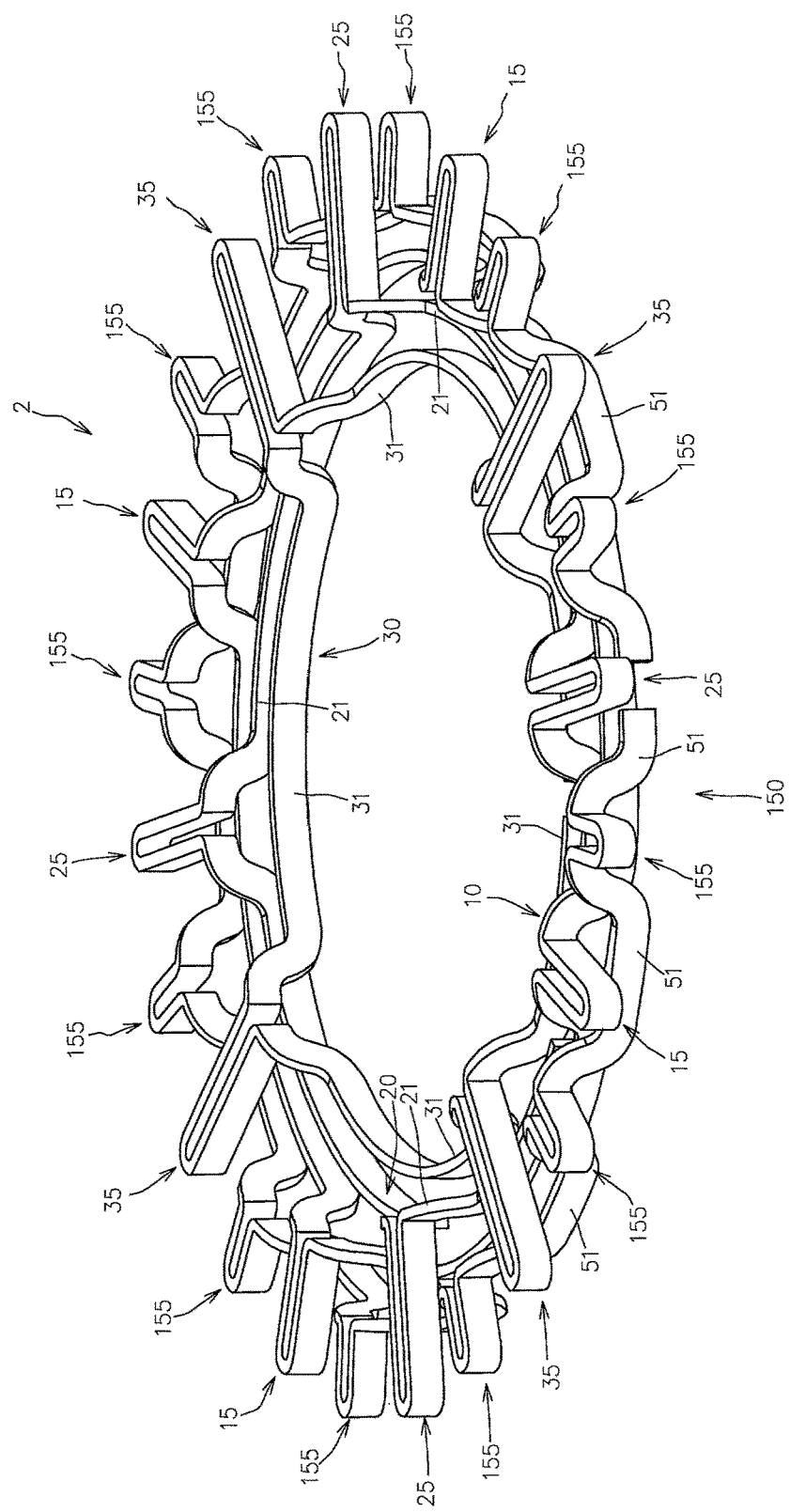
FIG. 10 is a perspective view of a bus ring unit according to another embodiment of the present invention.

FIG. 10 shows a perspective view of a bus ring unit 2 according to this embodiment.

Figure 11:
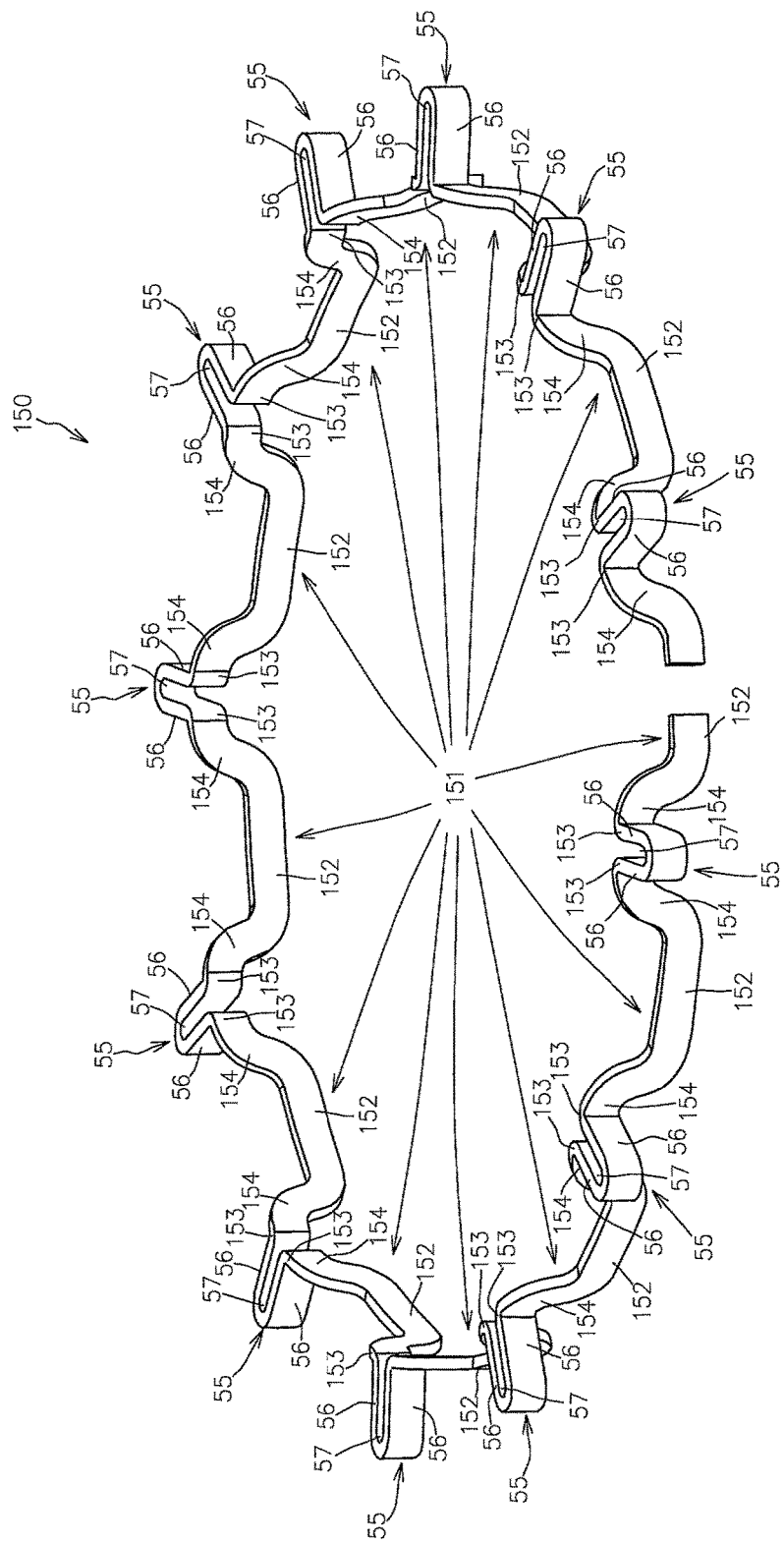
FIG. 11 a perspective view of a neutral-point bus ring in the bus ring unit shown in FIG. 11.
Figure 12:
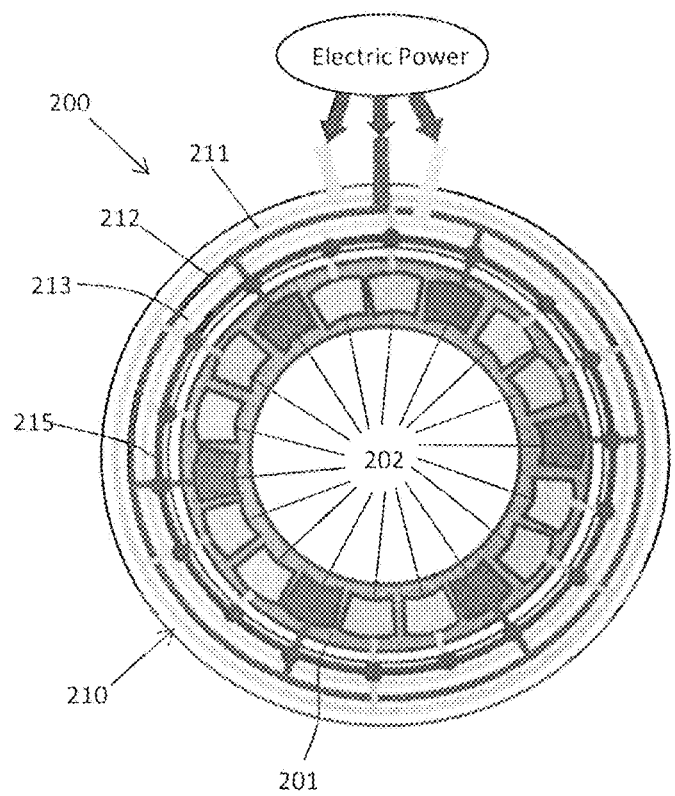
FIG. 12 is a schematic transverse cross-sectional view of a rotary electric motor.

FIG. 11 shows a perspective view of a neutral-point bus ring 150 in the bus ring unit 2.

In the drawings, the same components and the same parts as those in the first embodiment above are given the same reference numbers, and detailed descriptions thereof are omitted if appropriate.

In the bus ring unit 1 according to the first embodiment, the neutral-point-side connecting regions 55 are positioned in the first axial position, and displaced in the circumferential direction and also displaced in the axial direction relative to the first to third single-phase-side connecting regions 15, 25, and 35 that are positioned in the second axial position.

On the other hand, the neutral-point-side connecting regions 155 are positioned in the second axial position in the bus ring unit 2 according to this embodiment.

Specifically, compared with the bus ring unit 1 according to the first embodiment, the bus ring unit 2 according to this embodiment has a neutral-point bus ring 150 in place of the neutral-point bus ring 50.

As shown in FIGS. 10 and 11, the neutral-point bus ring 150 has a plurality of neutral-point-side rounded regions 151 and a plurality of neutral-point-side connecting regions 55.

With respect to the radial direction, the neutral-point-side rounded regions 151 are positioned on a reference circle as with the neutral-point-side rounded regions 51.

On the other hand, with respect to the axial positions, the neutral-point-side rounded regions 151 are configured differently from the neutral-point-side rounded regions 51.

Specifically, as shown in FIG. 11, the neutral-point-side rounded regions 151 have a neutral-point-side reference part 152 positioned in the first axial position and a neutral-point-side edge part 153 that includes a circumferential edge serving as a base point of the neutral-point-side projection 56 and is displaced in the axial direction relative to the neutral-point-side reference part 152 such that the circumferential edge is positioned in the second axial position.

The circumferential edges of the neutral-point-side rounded regions 151 are displaced in the circumferential direction relative to the first to third single-phase-side connecting regions 15, 25, and 36 as with the circumferential edges of the neutral-point-side rounded regions 51.

Thus, positioning the neutral-point-side edge parts 153 including the circumferential edges in the second axial position causes the pairs of neutral-point-side projections 56 extending radially outward from the circumferential edges to be also positioned in the second axial direction and, accordingly, the first to third single-phase-side connecting regions 15, 25, and 35 to which the single-phase-side ends of the terminal coils are connected and the neutral-point-side connecting regions 155 to which the neutral-point-side ends of the terminal coils are connected are all positioned in axially the same position (the second axial position).

In addition to providing the effects of the first embodiment, this configuration further facilitates the connecting work for connecting the single-phase-side ends and the neutral-point-side ends of the terminal coils to the corresponding connecting regions 15, 25, 35, and 155.

As shown in FIG. 11, in this embodiment, the neutral-point-side rounded regions 151 have a neutral-point-side transitional part 154 between the neutral-point-side reference part 152 and the neutral-point-side edge part 153.

The neutral-point-side transition part 154 is sloped from the neutral-point-side reference part 152 toward the neutral-point-side edge part 153 so as to be positioned from the first axial position to the second axial position as it comes close to the neutral-point-side edge part 153.

Due to the neutral-point-side transition part 154, performing forming processing on an electroconductive rectangular wire having a rectangular cross-sectional shape defined by a pair of long sides and a pair of short sides makes it possible, without shearing processing or pressing processing, to form the neutral-point bus ring 150 in which the pairs of neutral-point-side projections 56 face each other, with the pairs of neutral-point-side projections 56 being positioned in the second axial position and the long sides extending in the axial direction.

DESCRIPTION OF THE REFERENCE NUMERALS 1, 2 bus ring unit
10 first single-phase bus ring
11 first single-phase-side rounded region
12 first single-phase-side reference part
13 first single-phase-side edge part
14 first single-phase-side transition part
15 first single-phase-side connecting region
16 first single-phase-side projection
20 second single-phase bus ring
21 second single-phase-side rounded region
22 second single-phase-side reference part
23 second single-phase-side edge part
24 second single-phase-side transition part
25 second single-phase-side connecting region
26 second single-phase-side projection
30 third single-phase bus ring
31 third single-phase-side rounded region
32 third single-phase-side reference part
33 third single-phase-side edge part
34 third single-phase-side transition part
35 third single-phase-side connecting region
36 third single-phase-side projection
50, 150 neutral-point bus ring 51, 151 neutral-point-side rounded region
55 neutral-point-side connecting region
56 neutral-point-side projection
80 electroconductive rectangular wire
81 long side
82 short side
152 neutral-point-side reference part
153 neutral-point-side edge part
154 neutral-point-side transitional part

The invention claimed is:

1. A bus ring unit for electrically connecting pairs of ends of a plurality of stator coils respectively wound around a plurality of teeth of a stator, the pairs of ends appearing on one side in an axial direction of the stator, the bus ring unit comprising:
    single-phase bus rings for electrically connecting first ends of the pairs of ends of in-phase coils among the stator coils; and
    a neutral-point bus ring for electrically connecting second ends of the pairs of ends of the stator coils, wherein
    the neutral-point bus ring has a plurality of neutral-point-side rounded regions disposed at intervals in a circumferential direction so as to be positioned on a reference circle coaxial with the stator and positioned in a first axial position, and neutral-point-side connecting regions that are positioned in the first axial position and connect a circumferential edge of one neutral-point-side rounded region and an opposing circumferential edge of adjacent another neutral-point-side rounded region,
    the neutral-point-side connecting regions have a pair of neutral-point-side projections that extend radially outward from the circumferential edge of one neutral-point-side rounded region and the opposing circumferential edge of adjacent another neutral-point-side rounded region and are connected to each other at distal ends,
    the single-phase bus rings have a plurality of single-phase-side rounded regions disposed at intervals in the circumferential direction so as to be positioned on circles that are coaxial with the stator and have smaller diameters than the reference circle, and single-phase-side connecting regions for connecting a circumferential edge of one single-phase-side rounded region to an opposing circumferential edge of adjacent another single-phase-side rounded region,
    the single-phase-side rounded regions have a single-phase-side reference part positioned in the first axial position and a single-phase-side edge part that includes the circumferential edge, wherein the single-phase-side edge part is displaced in the circumferential direction and in the axial direction relative to the single-phase-side reference part such that the circumferential edge is displaced in the circumferential direction relative to the neutral-point-side connecting regions and positioned in a second axial position that is farther from the stator than the first axial position is in the axial direction,
    the single-phase-side connecting regions have a pair of single-phase-side projections, wherein each of the pair of single-phase-side projections is positioned in the second axial position, extend radially outward from the circumferential edge of one single-phase-side rounded region and the opposing circumferential edge of adjacent another single-phase-side rounded region beyond portions of the neutral-point-side rounded regions positioned in the first axial position, and are connected to each other at distal ends, and
    the single-phase-side rounded regions have a single-phase-side transition part positioned between the single-phase-side reference part and the single-phase-side edge part, and the single-phase-side transition part is inclined so as to be positioned from the first axial position to the second axial position as it extends from the single-phase-side reference part toward the single-phase-side edge part in the circumferential direction.

2. The bus ring unit according to claim 1, wherein an angle of inclination of the single-phase-side transition part between the first and second axial positions is about 10 degrees to about 80 degrees.

3. The bus ring unit according to claim 2, wherein
    the single-phase bus rings have an electroconductive rectangular wire having a rectangular cross-sectional shape defined by a pair of long sides and a pair of short sides,
    the single-phase-side reference part is arranged such that the pair of long sides extend in the axial direction,
    the single-phase-side transition part extends from the single-phase-side reference part with the pair of long sides extending in the axial direction, and
    the pair of single-phase-side projections extend radially outward from the circumferential edges of one single-phase-side rounded region and another single-phase-side rounded region with the pair of long sides extending in the axial direction, and the distal ends of the pair of single-phase-side projections are connected to each other with the pair of long sides extending in the axial direction.

4. The bus ring unit according to claim 1, wherein the pairs of neutral-point-side projections and the pairs of single-phase-side projections all have a U-shape as viewed from above to be spaced apart from a proximal side to a distal side to have a width that allows the ends of the stator coils to enter.

5. The bus ring unit according to claim 1, wherein the pairs of neutral-point-side projections and the pairs of single-phase-side projections all have an Ω-shape as viewed from above to be close to each other over a predetermined distance from a proximal side toward a distal side such that the ends of the stator coils cannot enter and spaced apart to have a width that allows the ends of the stator coils to enter on the distal side.

6. The bus ring unit according to claim 1, wherein
    the single-phase bus rings include first to third single-phase bus rings,
    the first single-phase bus ring has a plurality of first single-phase-side rounded regions disposed at intervals in the circumferential direction so as to be positioned on a first circle that is coaxial with the stator and that has a smaller diameter than the reference circle, and first single-phase-side connecting regions for connecting a circumferential edge of one first single-phase-side rounded region to an opposing circumferential edge of adjacent another first single-phase-side rounded region,
    the first single-phase-side rounded regions have a first single-phase-side reference part positioned in the first axial position and a first single-phase-side edge part that includes the circumferential edge and that is displaced in the circumferential direction and in the axial direction relative to the first single-phase-side reference part such that the circumferential edge is displaced in the circumferential direction relative to the neutral-point-side connecting regions and positioned in the second axial position, the first single-phase-side connecting regions have a pair of first single-phase-side projections that are positioned in the second axial position, extend radially outward from the circumferential edge of said one first single-phase-side rounded region and the opposing circumferential edge of said adjacent another first single-phase-side rounded region beyond portions of the neutral-point-side rounded regions positioned in the first axial position, and are connected to each other at distal ends, the second single-phase bus ring has a plurality of second single-phase-side rounded regions disposed at intervals in the circumferential direction so as to be positioned on a second circle that is coaxial with the stator and that has a smaller diameter than the first circle, and second single-phase-side connecting regions for connecting a circumferential edge of one second single-phase-side rounded region to an opposing circumferential edge of adjacent another second single-phase-side rounded region, the second single-phase-side rounded regions have a second single-phase-side reference part positioned in the first axial position and a second single-phase-side edge part that includes the circumferential edge and that is displaced in the circumferential direction and in the axial direction relative to the second single-phase-side reference part such that the circumferential edge is displaced in the circumferential direction relative to the neutral-point-side connecting regions and the first single-phase-side connecting regions and positioned in the second axial position, the second single-phase-side connecting regions have a pair of second single-phase-side projections that are positioned in the second axial position, extend radially outward from the circumferential edge of said one second single-phase-side rounded region and the opposing circumferential edge of said adjacent another second single-phase-side rounded region beyond portions of the neutral-point-side rounded regions and the first single-phase-side rounded regions positioned in the first axial position, and are connected to each other at distal ends, the third single-phase bus ring has a plurality of third single-phase-side rounded regions disposed at intervals in the circumferential direction so as to be positioned on a third circle that is coaxial with the stator and that has a smaller diameter than the second circle, and third single-phase-side connecting regions for connecting a circumferential edge of one third single-phase-side rounded region to an opposing circumferential edge of adjacent another third single-phase-side rounded region, the third single-phase-side rounded regions have a third single-phase-side reference part positioned in the first axial position and a third single-phase-side edge part that includes the circumferential edge and that is displaced in the circumferential direction and in the axial direction relative to the third single-phase-side reference part such that the circumferential edge is displaced in the circumferential direction relative to the neutral-point-side connecting regions, the first single-phase-side connecting regions, and the second single-phase-side connecting regions, and positioned in the second axial position, and the third single-phase-side connecting regions have a pair of third single-phase-side projections that are positioned in the second axial position, extend radially outward from the circumferential edge of said one third single-phase-side rounded region and the opposing circumferential edge of said adjacent another third single-phase-side rounded region beyond portions of the neutral-point-side rounded regions, the first single-phase-side rounded regions, and the second single-phase-side rounded regions positioned in the first axial position, and are connected to each other at distal ends.

7. The bus ring unit according to claim 6, wherein lengths of the pairs of neutral-point-side projections, the pairs of first single-phase-side projections, the pairs of second single-phase-side projections, and the pairs of third single-phase-side projections are set such that distal ends are positioned in the same radial position.

8. A bus ring unit for electrically connecting pairs of ends of a plurality of stator coils respectively wound around a plurality of teeth of a stator, the pairs of ends appearing on one side in an axial direction of the stator, the bus ring unit comprising:

single-phase bus rings for electrically connecting first ends of the pairs of ends of in-phase coils among the stator coils; and a neutral-point bus ring for electrically connecting second ends of the pairs of ends of the stator coils, wherein the neutral-point bus ring has a plurality of neutral-point-side rounded regions disposed at intervals in a circumferential direction so as to be positioned on a reference circle coaxial with the stator, and neutral-point-side connecting regions that connect a circumferential edge of one neutral-point-side rounded region and an opposing circumferential edge of adjacent another neutral-point-side rounded region, the neutral-point-side rounded regions have a neutral-point-side reference part positioned in a first axial position and a neutral-point-side edge part that includes the circumferential edge, wherein the neutral-point-side edge part is displaced in the axial direction relative to the neutral-point-side reference part such that the circumferential edge is positioned in a second axial position that is farther from the stator than the first axial position is in the axial direction, the neutral-point-side connecting regions have a pair of neutral-point-side projections, wherein each of the pair of neutral-point-side projections extends radially outward from the circumferential edge of one neutral-point-side rounded region and the opposing circumferential edge of adjacent another neutral-point-side rounded region with the pair of neutral-point-side projections being positioned in the second axial position, and is connected to each other at distal ends, the single-phase bus rings have a plurality of single-phase-side rounded regions disposed at intervals in the circumferential direction so as to be positioned on a circle that is coaxial with the stator and have a smaller diameter than the reference circle, and single-phase-side connecting regions for connecting a circumferential edge of one single-phase-side rounded region and an opposing circumferential edge of adjacent another single-phase-side rounded region, the single-phase-side rounded regions have a single-phase-side reference part positioned in the first axial position and a single-phase-side edge part that includes the circumferential edge, wherein the single-phase-side edge part is displaced in the circumferential direction and in the axial direction relative to the single-phase-side reference part such that the circumferential edge is displaced in the circumferential direction relative to the neutral-point-side connecting regions and positioned in the second axial position, the single-phase-side connecting regions have a pair of single-phase-side projections, wherein each of the pair of single-phase-side projections is positioned in the second axial position, extends radially outward from the circumferential edge of one single-phase-side rounded region and the opposing circumferential edge of adjacent another single-phase-side rounded region beyond portions of the neutral-point-side rounded regions positioned in the first axial position, and is connected to each other at distal ends, and the neutral-point-side rounded regions have a neutral-point-side transition part positioned between the neutral-point-side reference part and the neutral-point-side edge part, and the neutral-point-side transition part is inclined so as to be positioned from the first axial position to the second axial position as it extends from the neutral-point-side reference part toward the neutral-point-side edge part in the circumferential direction.

9. The bus ring unit according to claim 8, wherein an angle of inclination of the neutral-point-side transition part between the first and second axial positions is about 10 degrees to about 80 degrees.

10. The bus ring unit according to claim 9, wherein the neutral-point bus ring has an electroconductive rectangular wire having a rectangular cross-sectional shape defined by a pair of long sides and a pair of short sides, the neutral-point-side reference part is arranged such that the pair of long sides extend in the axial direction, the neutral-point-side transition part extends from the neutral-point-side reference part with the pair of long sides extending in the axial direction, and the pair of neutral-point-side projections extend radially outward from the circumferential edges of one neutral-point-side rounded region and another neutral-point-side rounded region with the pair of long sides extending in the axial direction, and the distal ends of the pair of neutral-point-side projections are connected to each other with the pair of long sides extending in the axial direction.

11. A bus ring unit for electrically connecting pairs of ends of a plurality of stator coils respectively wound around a plurality of teeth of a stator, the pairs of ends appearing on one side in an axial direction of the stator, the bus ring unit comprising:

single-phase bus rings for electrically connecting first ends of pairs of ends of in-phase coils among stator coils, wherein the single-phase bus rings are coaxial with the stator and each comprises a plurality of single-phase base sections and a plurality of single-phase connection sections; and a neutral-point bus ring for electrically connecting second ends of the pairs of ends of the stator coils, wherein the neutral-point bus ring is coaxial with the stator and comprises a plurality of neutral-point base sections and a plurality of neutral-point connection sections, wherein the single-phase base sections and the neutral-point base sections are disposed in a first axial plane, wherein the single-phase connection sections are disposed in a second axial plane separate from and parallel to the first axial plane along the axial direction of the stator, and wherein the neutral-point bus ring comprises an inner diameter greater than an outer diameter of the single-phase bus rings.

12. The bus ring unit according to claim 11, wherein the neutral-point connection sections are disposed in the first axial plane.

13. The bus ring unit according to claim 12, wherein the single-phase bus rings each comprises a plurality of single-phase transition sections between each single-phase base section and single-phase connection section and each single-phase transition section is sloped from the first axial plane to the second axial plane.

14. The bus ring unit according to claim 11, wherein the neutral-point connection sections are disposed in the second axial plane.

15. The bus ring unit according to claim 14, wherein:

the single-phase bus rings each comprises a plurality of single-phase transition sections between each single-phase base section and single-phase connection section and each single-phase transition section is sloped from the first axial plane to the second axial plane; and the neutral-point bus ring comprises a plurality of neutral-point transition sections between each neutral-point base section and neutral-point connection section and each neutral-point transition section is sloped from the first axial plane to the second axial plane.

* * * * *